US008811963B2

(12) United States Patent
Voehringer

(10) Patent No.: US 8,811,963 B2
(45) Date of Patent: Aug. 19, 2014

(54) MAKING A TELEPHONE CONNECTION TO A MOBILE COMMUNICATION TERMINAL WITH THE CALLING PARTY CONTROLLING HOW THE CALL SHOULD BE ESTABLISHED

(75) Inventor: Gerrit Voehringer, Bonn (DE)

(73) Assignee: Deutsche Telekom, Bonn (DE)

( * ) Notice: Subject to any disclaimer, the term of this patent is extended or adjusted under 35 U.S.C. 154(b) by 222 days.

(21) Appl. No.: 13/260,263

(22) PCT Filed: May 26, 2010

(86) PCT No.: PCT/EP2010/003183
§ 371 (c)(1),
(2), (4) Date: Sep. 24, 2011

(87) PCT Pub. No.: WO2010/136181
PCT Pub. Date: Dec. 2, 2010

(65) Prior Publication Data
US 2012/0071148 A1 Mar. 22, 2012

(30) Foreign Application Priority Data

May 26, 2009 (DE) .......................... 10 2009 022 749

(51) Int. Cl.
*H04M 3/42* (2006.01)
*H04M 3/54* (2006.01)

(52) U.S. Cl.
CPC ............ *H04M 3/42* (2013.01); *H04M 2207/12* (2013.01); *H04M 2203/2033* (2013.01); *H04M 3/54* (2013.01)
USPC ........ 455/417; 455/406; 455/412.2; 455/433; 455/466; 455/414.1; 455/432.1; 455/418

(58) Field of Classification Search
CPC ........... H04M 4/16; H04M 8/18; H04M 8/26; H04M 88/06; H04M 3/54; H04M 2203/1091
USPC ........... 455/432.1, 418, 412.2, 417, 406, 433, 455/445, 408, 466, 414.1
See application file for complete search history.

(56) References Cited

U.S. PATENT DOCUMENTS

2006/0205404 A1* 9/2006 Gonen et al. ............... 455/432.1
(Continued)

FOREIGN PATENT DOCUMENTS

| DE | 19711096 | 9/1998 |
|---|---|---|
| WO | 01037523 | 5/2001 |
| WO | 2008010217 | 1/2008 |

OTHER PUBLICATIONS

"3D Generation Partnership Project . . . " Technical Specifications 2008.

*Primary Examiner* — Joseph Arevalo
(74) *Attorney, Agent, or Firm* — Andrew Wilford

(57) ABSTRACT

The invention relates to a method for establishing a telephone connection to a mobile communications terminal device (11) via a mobile communications network (5, 7, 9), with at least one mobile telephone number being assigned to the mobile communications terminal device (11), wherein a supplement i.e. prefix or suffix as a control parameter is added to the mobile telephone number, the supplement being independent from the mobile telephone number. Before establishing the telephone connection an analysis of this supplement is made and the reachability of the mobile communications terminal device (11) is determined. The "reachability" is that the calling party only wants to make the call if the called party is available in real time i.e. does not want to be forwarded to voice-mail. Another example is that the call should only be established for calls that remain in the same network, so as to save costs. The supplement indicates whether the establishment of a telephone connection shall be initiated or suppressed. The establishment of the telephone connection is then initiated dependent upon the supplement only if there is a certain reachability case of the called mobile communications terminal device (11), the reachability case being indicated by the supplement.

17 Claims, 1 Drawing Sheet

(56) References Cited

U.S. PATENT DOCUMENTS

| | | | |
|---|---|---|---|
| 2008/0160963 A1* | 7/2008 | Chi et al. | 455/412.2 |
| 2009/0028313 A1 | 1/2009 | Bouvet | |
| 2010/0330987 A1* | 12/2010 | Lee | 455/432.1 |
| 2012/0244850 A1* | 9/2012 | Doherty et al. | 455/418 |

* cited by examiner

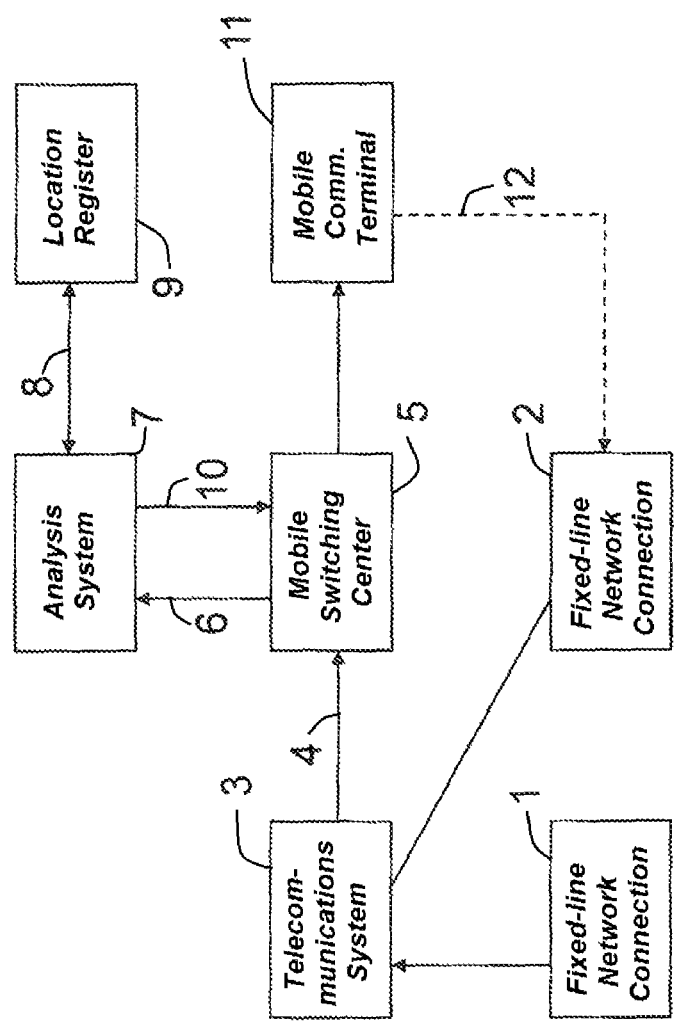

MAKING A TELEPHONE CONNECTION TO A MOBILE COMMUNICATION TERMINAL WITH THE CALLING PARTY CONTROLLING HOW THE CALL SHOULD BE ESTABLISHED

CROSS REFERENCE TO RELATED APPLICATIONS

This application is the US-national stage of PCT application PCT/EP2010/003183 filed 26 May 2010, published 2 Dec. 2010 as WO2010/136181, and claiming the priority of German patent application 102009022749.0 itself filed 26 May 2009, whose entire disclosures are herewith incorporated by reference.

FIELD OF THE INVENTION

The invention relates to a method for establishing a telephone connection to a mobile communications terminal device via a mobile communications network, with at least one mobile telephone number being assigned to the mobile communications terminal device, wherein a supplement as a control parameter is added to the mobile telephone number, the supplement being independent from the mobile telephone number.

BACKGROUND OF THE INVENTION

Such methods are known for establishing a telephone connection to a mobile communications terminal device logged into a mobile communications network, in particular within a cellular mobile communications network. In these methods, the mobile communications terminal device is registered in the home location register of the mobile communications network. Moreover, its current position is precisely known down to a few cells of the cellular mobile communications network such that, after querying the home location register by means of a so-called paging (broadcast via multiple cells of the mobile communications network), a call connection may be initiated to the mobile communications terminal device via the mobile communications network.

Moreover, it is known to add supplements to telephone numbers. For example DE 197 11 096 A1 describes a method according to which it is checked whether the land, local or network area code is used in a telephone number when this number is called, the telephone number being dialed from the internal telephone book of the mobile communication terminal device. If the area code is missing it is automatically added to the telephone number. Otherwise, a communication setup originating from a visited mobile network, in particular a foreign network, is not possible or may lead to an undesired subscriber of the visited network. In this case, the area code forms a supplement, i.e. the supplement is part of the telephone number to be dialed. Furthermore, it is known from WO 01/37523 A1 and WO 2008/010217 A1 to add a supplement to a telephone number to activate or control a special service. WO 01/37523 A1 discloses a call-back service for roaming mobile subscribers, the service can be activated from a visited network into which the subscriber is logged. At first it is determined if the calling subscriber is logged into a home or visited network. In the latter case the telephone number to be dialed is extended by a service number/service address. WO 2008/010217 A1 discloses a similar call-back service for roaming mobile communication subscriber, wherein a service number is formed by a dummy-prefix and a service request code if the calling subscriber is logged into a visited mobile communication network. The service request code can be a valid telephone number.

In the known methods for establishing a telephone connection to a mobile communications terminal device, it is problematic that different networks can be responsible for monitoring and for conducting the method. Thus, when a call is attempted, for example, from a fixed-line network, the mobile telephone number is dialed and then a query of the home location register occurs within the mobile communications network in order to determine the cell location, i.e. the network area, into which the mobile communications terminal device to which the mobile telephone number has been assigned is logged. If the user of the mobile communications terminal device has established a call forwarding or the like, for example, to a mobile box on which a call may be recorded in the case of non-reachability, control of said alternative call routing occurs within the mobile communications network of the called party, with the caller having no influence on this process.

Conversely, it is problematic that, if control of the call is carried out by the fixed-line network and a call into mobile communications network is set up, it is not known whether, for example, the mobile communications terminal device is available and/or where it is located. Therefore, for example, a parallel call is usable only to a limited extent because, for example, routing the call back to the calling substation of the fixed-line network from which the call itself is originating would lead to termination of the call. This effect is also known as tromboning.

OBJECT OF THE INVENTION

The object of the invention is to develop a method for establishing a telephone connection to a mobile communications terminal device via a mobile communications network in such a way that the disadvantages described above are overcome and expedient control of calls with the greatest possible variability of the method is allowed.

SUMMARY OF THE INVENTION

This object is attained according to the invention in a method for establishing a telephone connection to a mobile communications terminal device via a mobile communications network, with at least one mobile telephone number being assigned to the mobile communications terminal device, wherein a supplement as a control parameter is added to the mobile telephone number, the supplement being independent from the mobile telephone number, it is particularly advantageous that before establishing the telephone connection an analysis of this supplement is made and the reachability status of the mobile communications terminal device is determined, wherein the supplement indicates whether the establishment of a telephone connection shall be initiated or suppressed, and the establishment of the telephone connection is initiated dependent upon the supplement only if there is a certain reachability case of the called mobile communications terminal device, the reachability case being indicated by the supplement.

The presets may, in particular be call forwarding settings or alternative routing settings or the like.

The term "initiating establishment of a telephone connection" is to be understood as the actual establishment of a call on the network's side from the calling terminal device. The setup of the telephone connection can be directed to the mobile communication terminal device or another communication terminal device to which call forwarding is established and used if the mobile communication terminal device is not reachable. A lack of reachability in this sense exists if the mobile communication terminal device is not logged into a mobile communication network, a call directed to the mobile communication terminal device is not answered after a waiting time, or it is spoken at the mobile communication terminal device and, therefore, the telephone communication can not be established to the mobile communication terminal device.

According to the invention the supplement is a control parameter with which call control is possible on the side of the caller, the supplement being independent from the mobile telephone number. This means that the supplement is a numeric extension that is not a part of a telephone number, in particular no land, local or network area code.

It should be understood that the terms . . . reachability" and "reach ability case" in the meaning of the present invention refer to the fact if, where and how the called mobile communications terminal device can currently be reached, in particular, if calls to the mobile terminal device can be put through to the terminal device or if the device is not reachable, in particular with a call forwarding being established, where the mobile communications terminal device is located geographically, i.e. in which mobile network area the mobile communications terminal device is logged into and can currently be reached, and how the mobile terminal device can be reached technically, i.e. via which mobile communications network. The mobile network area can be identified by one or more mobile network cells of the home network of the mobile communications terminal device or of a visited network within the home country or a foreign country.

According to the invention reachability of the called mobile communication terminal device is determined before the telephone connection is established. If the general, geographic and/or technical reachability is determined it is analyzed if the supplement indicates whether the establishment of the telephone connection should be initiated or suppressed, wherein the establishment of the telephone connection is initiated depended upon the supplement only if there is a certain reachability case of the called mobile communication terminal device, the reachability case being indicated by the supplement. This means that in certain cases of reachability an establishment of the telephone connection is suppressed and in other cases of reachability the telephone connection is initiated. Suppression for example can take place if the called mobile communication terminal device is logged into a visited communication network and/or in a foreign country, if it is not logged into a predetermined mobile network area, or if call forwarding is established. Furthermore, an establishment of the telephone connection can be initiated in particular when the mobile communication terminal device can be reached via a predetermined mobile communication network, within a predetermined network area, within a predetermined geographic location, and/or if the mobile communication terminal device can be reached in general, i.e. if no call forwarding is activated. According to the invention the supplement defines in which case or cases of reachability a telephone connection is established or suppressed.

The invention thus provides a method in which, by suitable signaling, the call control may be diverted from the mobile telephone network into the network initiating the call. Here, no additional administration is necessary other than the data typically present in the home location register of the mobile network operator, i.e., the authority over the establishment of the call lies to a large extent in the network initiating the call. The calling network can be a fixed line network or a mobile communication network.

This allows the realization of the following functions in particular:

Parallel calling, in particular taking into account login status, location (domestic, foreign, or even inside or outside the so-called "home zone") as well as alternative call routing, etc.

Suppression of broker calls or conferencing in order to prevent so-called "tromboning"

Suppression of alternative call routing in the mobile communications network

Overriding of alternative call routing in the mobile communications network

Delivery of a call depending on the location of the called terminal device within or outside of a home zone or any other zone that may be established as desired.

Modification of the transmitted caller data for signaling, for example, an internal call within a company.

The supplement is preferably a prefix and/or an insertion and/or a suffix to the mobile telephone number, in particular a numeric supplement.

The mobile telephone number MSISDN is typically formed by a country code as well as a network code as well as the individual or personal telephone number. The supplement that is analyzed in order to establish the mobile telephone connection may be placed in front of this mobile telephone number MSISDN in the form or a prefix and/or appended to it in the form of a suffix and/or be added to it in the form of an insert placed into the MSISDN. This allows a very simple administration of the establishment of a call.

Preferably, as a function of the supplement, the establishment of a connection is only initiated when the mobile communications terminal device is logged into a definable mobile communications network and/or a definable group of mobile communications networks. For example the supplement can contain an information indicating that the telephone connection shall be established only if the mobile communication terminal device is logged into a domestic mobile communication network, in particular is logged into the same network as the terminal device of the calling subscriber. This makes it possible to control the calling costs as calls in foreign networks, in particular to foreign countries cause comparatively high costs and, therefore, could be avoided.

It is possible to determine into which the mobile communications terminal device is currently logged in by querying the home location register of the home mobile communications network. In this manner, it is possible to guarantee that the establishment of a call only occurs when, for example, the called mobile communications terminal device is logged into its home network or, for example, other networks of cooperation partners of the mobile communications network operator that are designated as equivalent, or the like.

Preferably, dependent upon the supplement, the establishment of a connection is only initiated if the mobile communications terminal device is logged into a definable mobile communications network area. Thus, it is possible for the establishment of a call to occur only when the mobile communications terminal device is logged into its home zone or at certain other locations such as, for example, an exhibition center, a waterfront area, a construction site, or the like.

In a preferred embodiment, call forwarding is suppressed dependent upon the supplement. This means that a telephone connection originating at the calling subscriber is then not established, if the mobile communications terminal device is not reachable and a call forwarding to a different subscriber terminal, in particular to a mailbox has been established. In this manner, the undesired or nonproductive call forwarding may be suppressed.

In an additional preferred embodiment, call forwarding is overridden dependent upon the supplement. This means that instead of a call forwarding established by the called subscriber, a call is forwarded to a target number given by the calling party. In this manner, it is possible to prevent a nonsensical or undesired alternative routing of a call to be established and, instead, to forward it to another target telephone number that may be specified, the target telephone number being to be called when an alternative call routing has been programmed by the user of the mobile communications terminal device. Preferably the supplement contains an alternative telephone number as a new target number to which the telephone connection is to be established if a call forwarding is active.

Preferably, the establishment of a connection is initiated depending on the supplement only within definable land borders, in particular only within the home country, in particular only within a certain domestic mobile communications network. This allows effective control of costs by preventing international calls because the current location of the called mobile communications terminal device is unknown to the caller.

In a preferred embodiment, the supplement indicates geographic location information and/or a mobile network area, wherein the establishment of a connection is only initiated if the mobile communications terminal device is logged into the mobile communications network area which is identified directly or by the geographic location information.

The reachability of the mobile communications terminal device can be determined by means of a query to the home location register in which the actual location is registered in the form of mobile network cells, the mobile communication terminal device may be reached in these cells. It follows that, by means of determination of the reachability, the mobile network area is determined into which the mobile communication terminal device is logged. By a query to the home location register HLR of the mobile communications network operator, the current location of the mobile communications terminal device is thus queried, whereby targeted connections may only be established in certain locations such as, for example, an exhibition center, a construction site, or the like that may be indicated by the supplement.

Moreover, by means of determination of the reachability, it is also determined if call forwarding is established, in particular, to a mobile box.

BRIEF DESCRIPTION OF THE DRAWING

An embodiment of the method according to the invention is described in greater detail with reference to the attached schematic drawing.

SPECIFIC DESCRIPTION OF THE INVENTION

A telecommunications system 3 inside a fixed line network has two fixed line network connections 1 and 2. A telephone connection from the fixed line connection 1 is now to be established to the mobile communications terminal device 11.

The mobile communications terminal device 11 is used by the same user as that of the terminal device 2 associated with the telecommunications system 3, with the caller from the terminal device 1 wishing to prevent a forwarding of the call to the fixed line network connection 2, i.e., a telephone connection to the mobile communications terminal device 11 should only be established if said mobile communications terminal device is reachable, i.e. currently logged in and available, and, moreover, any alternative call routing 12 (dashed line) from the mobile communications terminal device 11 to the extension 2 shall be is suppressed.

The method according to the invention is based on the interaction between the telecommunications system 3 in the fixed line network and an intelligent system in the mobile communications network as is explained below. Within the telecommunications system 3, a prefix is placed in front of the mobile telephone number MSISDN assigned to the mobile communications terminal device 11 on the line 4 to the mobile services switching center (MSC) 5.

If the telecommunications system 3 initiates a call to a subscriber of a mobile communications network, so-called user-to-user information is transmitted on the line 4 in the DSS 1 protocol and a suitable prefix is placed in front of the telephone number, the prefix then directs the call to the mobile communications network and initiates intelligent treatment of the call there.

This prefix and the so-called user-to-user information are transparently routed (transmitted, forwarded) through the mobile-services switching centers and may be analyzed by the analysis system 7 in the mobile communications network. To this end, the mobile-services switching center 5 directs a corresponding query 6 to the intelligent network system 7 within the mobile communications network.

The analysis system 7 communicates with the home location register 9 via the connection 8 and obtains the required information of the reachability of the mobile communication terminal device 11 for establishing the telephone connection to it. The corresponding information is returned to the analysis system 7 that determines depending on the prefix if the connection to the mobile terminal device can be established or shall be suppressed. The analysis system 7 then provides a corresponding response 10 to the mobile-services switching center 5 which may establish the call to the mobile communications terminal device 11.

Within the analysis system 7, i.e., within the intelligent network of the mobile communications network, depending on the prefix received, the further telephone connection is proceeded or cancelled and a signal is returned to the telecommunications system 3 that the establishment of the call is impossible or undesired because of the given supplement and the current reachability status of the terminal device 11 to be called.

Part of the so-called user-to-user information may be, for example:

Suppress GSM call forwarding.

Override GSM call forwarding.

Only deliver call if called device is located inland (to this end, the analysis unit 7 queries the home location register 9 (HLR) of the mobile communications network via the connection 8 and determines where the mobile terminal device is logged in, in particular, if the terminal device is logged into a domestic mobile communications network).

Verify the current location of the terminal device 11 by querying the home location register 9 and a subsequent so-called prepaging and deliver the call only if the location is in the vicinity of a position contained in the transmitted supplement, i.e. within one or more network cells that cover a geographic location indicated by the supplement.

Suppress broker calls and/or conferencing etc.

A particular advantage of the method described here is that no telecommunications-specific administration is necessary in the mobile communications network because all information are provided exclusively in the telecommunications system and are signaled to the mobile communications system if needed when call connections are to be connected.

Moreover, problem-free interaction with other intelligent services on the mobile communications side is possible such as, for example, prepaid services, etc.

Moreover, the user-to-user information may be encrypted by means of a public key method (encryption method that uses a public key for encryption) in order to prevent abuse. Thus, it is possible to guarantee that the corresponding information may be used for control only by those systems that possess the corresponding private key.

The invention claimed is:

1. A method of controlling establishment or suppression of a telephone connection between a calling terminal of a calling part and a called mobile communications terminal via a mobile communications network with the calling party determining in which case or cases of reachability of the called mobile terminal the telephone connection is to be established or suppressed, at least one mobile telephone number being assigned to the mobile communications terminal, the method comprising the steps of:
  the calling party calling the mobile terminal using the mobile telephone number thereof;
  adding to the called telephone number a supplement as a control parameter that is independent from the called mobile telephone number and that indicates a case of reachability of the called mobile terminal depending on which the telephone connection is to be established or suppressed;
  determining the reachability of the mobile communications terminal at least by checking the establishment of an alternate call routing;
  analyzing if the determined reachability corresponds to the case of reachability indicated by the supplement;
  establishing the telephone connection only if the determined reachability corresponds to the case of reachability indicated by the supplement; and
  logging the mobile communications terminal
    into a definable mobile communications network, or
      within a definable group of mobile communications networks or
    into a definable mobile communications network area.

2. The method according to claim 1, wherein the supplement is a prefix and/or an insertion and/or a suffix to the mobile telephone number.

3. The method according to claim 1, wherein the supplement is user-to-user information.

4. The method according to claim 1, wherein call forwarding is suppressed dependent upon the supplement.

5. The method according to claim 1, wherein call forwarding is overridden dependent upon the supplement.

6. The method according to claim 5, wherein the supplement contains an alternative telephone number to which the telephone connection will be routed if an alternate call routing is established.

7. The method according to claim 1, wherein, dependent upon the supplement, the establishment of the connection is initiated only within predetermined land borders.

8. The method according to claim 1, wherein the supplement contains geographic location information or a mobile communications network area, and the establishment of a connection is only initiated if the mobile communications terminal is logged into the mobile communications network area identified directly or by the geographic location information.

9. The method according to claim 1, wherein the reachability of the mobile communications terminal is determined by a query to the home location register.

10. The method according to claim 1, wherein the mobile communications network area into which the mobile communications terminal is logged is determined by the determination of the reachability of the mobile communications terminal.

11. The method according to claim 1, wherein the supplement contains information about the predetermined mobile communications network.

12. A method of controlling establishment or suppression of a telephone connection between a calling terminal of a subscriber and a called mobile communications terminal via a mobile communications network with the subscriber calling the mobile communications terminal defining in which case or cases of reachability of the called mobile communications terminal the telephone connection is to be established or suppressed, at least one mobile telephone number being assigned to the called mobile communications terminal, the method comprising the steps of:
  the subscriber calling the mobile communications terminal using the mobile telephone number thereof;
  adding to the called mobile telephone number a supplement as a control parameter that is independent from the called mobile telephone number and that indicates a reachability case of the called mobile communications terminal depending on which the telephone connection is to be established or suppressed;
  determining the reachability of the called mobile communications terminal and by checking establishment of call forwarding and alternate call routing to a different subscriber terminal;
  analyzing if the determined reachability does or does not correspond to the reachability case indicated by the supplement; and
  suppressing the telephone connection to the called mobile communications terminal if call forwarding is activated.

13. The method according to claim 12, wherein the supplement is a prefix and/or an insertion and/or a suffix to the mobile telephone number.

14. The method according to claim 12, wherein the supplement is user-to-user information.

15. The method according to claim 12, wherein call forwarding is overridden dependent upon the supplement.

16. The method according to claim 15, wherein the supplement contains an alternative telephone number to which the telephone connection will be routed if an alternate call routing is established.

17. The method according to claim 12, wherein the reachability of the mobile communications terminal is determined by a query to the home location register.

* * * * *